(12) United States Patent
Rajagopal et al.

(10) Patent No.: US 10,581,643 B1
(45) Date of Patent: Mar. 3, 2020

(54) INDUCTORS FOR POWER OVER DATA LINE CIRCUITS

(71) Applicants: Abhilash Rajagopal, Sunnyvale, CA (US); Paul A. Baker, Los Altos, CA (US); Neven Pischl, San Jose, CA (US)

(72) Inventors: Abhilash Rajagopal, Sunnyvale, CA (US); Paul A. Baker, Los Altos, CA (US); Neven Pischl, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/124,820

(22) Filed: Sep. 7, 2018

Related U.S. Application Data

(60) Provisional application No. 62/614,041, filed on Jan. 5, 2018, provisional application No. 62/561,293, filed on Sep. 21, 2017.

(51) Int. Cl.
*H04L 25/02* (2006.01)
*H04L 12/10* (2006.01)
*H04L 12/40* (2006.01)

(52) U.S. Cl.
CPC .......... *H04L 25/0274* (2013.01); *H04L 12/10* (2013.01); *H04L 12/40045* (2013.01); *H04L 25/0266* (2013.01)

(58) Field of Classification Search
CPC . H04L 25/0274; H04L 25/0266; H04L 12/10; H04L 12/40045; H04L 25/14; H04L 25/4925; H04L 5/20; H04L 25/0272; H04L 25/49
See application file for complete search history.

(56) References Cited

U.S. PATENT DOCUMENTS

| 2009/0002110 | A1* | 1/2009 | Ahangar | ................. | H01F 27/10 336/60 |
| 2011/0133488 | A1* | 6/2011 | Roberts | .................. | H02K 35/02 290/1 R |

OTHER PUBLICATIONS

Keysight Technologies, "Signal Integrity Analysis Series, Part 1: Single-Port TDR, TDR/TDT, and 2-Port TDR", Application Note, Oct. 29, 2015 (74 pp).
Chini, A., "Design Challenges for PoDL Coupling Circuit in 100BASE-T1 and 1000BASE-T1", Nov. 3, 2014 (10 pp.).

(Continued)

*Primary Examiner* — Ted M Wang
(74) *Attorney, Agent, or Firm* — Young Basile Hanlon & MacFarlane, P.C.

(57) ABSTRACT

Systems for power over data line applications with low mode conversion are described. For example, an apparatus may include a magnetic core; a first conductive coil wound in a first winding direction around the magnetic core; a second conductive coil wound in a second winding direction around the magnetic core; a first conductive lead connecting a first end of the first conductive coil to a first pin; a second conductive lead connecting a second end of the first conductive coil to a second pin; a third conductive lead connecting a first end of the second conductive coil to a third pin, wherein lengths of the first conductive lead and the third conductive lead are equal; and a fourth conductive lead connecting a second end of the second conductive coil to a fourth pin, wherein lengths of the second conductive lead and the fourth conductive lead are equal.

20 Claims, 10 Drawing Sheets

(56) References Cited

OTHER PUBLICATIONS

Murata Manufacturing Co., Ltd., "Common Mode Choke Coil for In-Vehicle Use", https://www.murata.com/en-us/about/newsroom/techmag/metamorphosis18/productsmarket/chokecoil, downloaded Oct. 3, 2017 (4 pp).
Pulse, A Technitrol Company, "Understanding Common Mode Noise", G019.A, Apr. 1999 (7 pp).
Mouser Electronics, "Murata DLW43MH Series Common Mode Choke Inductors", https://www.mouser.com/new/murata/murata-dlw43mh/, downloaded Oct. 3, 2017 (2 pp).
Gardner, Andy, "Optional Powering Based on PoDL for 10SPE", Linear Technology, http://www.ieee802.org/3/10SPE/public/Sept2016_Interim/gardner_10SPE_01_0916.pdf, Sep. 2016 (13 pp).
Gardner, Andy, "Proposal for Relaxed MDI Return Loss Limit and Results of Prototype PoDL Coupling Network for 1000BASE-T1", Linear Techology, http://www.ieee802.org/3/bu/public/jan16/gardner_01a_3bu_0116.pdf, Jan. 2016 (13 pp).
TDK, "Inductors for Decoupling Circuits" Wound Ferrite, ADL-V Series (for automobiles), 20170110 /inductor_automotive_decoupling_ad13225v_en., Jan. 2017 (10 pp).

\* cited by examiner

400

402

SUPPLY A FIRST CURRENT FROM A DC VOLTAGE SOURCE THROUGH A FIRST INDUCTANCE TO A FIRST DATA-LINE CONDUCTOR FOR TRANSMISSION TO AN ELECTRONIC SYSTEM

404

SUPPLY A SECOND CURRENT FROM THE DC VOLTAGE SOURCE THROUGH A SECOND INDUCTANCE TO A SECOND DATA-LINE CONDUCTOR FOR TRANSMISSION TO THE ELECTRONIC SYSTEM, WHEREIN A THIRD INDUCTANCE BETWEEN THE FIRST DATA-LINE CONDUCTOR AND THE SECOND DATA-LINE CONDUCTOR IS GREATER THAN THE FIRST INDUCTANCE AND THE SECOND INDUCTANCE

406

CARRY A RETURN CURRENT FROM THE ELECTRONIC SYSTEM TO THE DC VOLTAGE SOURCE VIA A CONDUCTIVE SUPPORT STRUCTURE

502
SUPPLY A FIRST CURRENT FROM AN ELECTRONIC SYSTEM VIA A FIRST DATA-LINE CONDUCTOR THROUGH A FIRST INDUCTANCE TO AN ELECTRICAL LOAD

504
SUPPLY A SECOND CURRENT FROM THE ELECTRONIC SYSTEM VIA A SECOND DATA-LINE CONDUCTOR THROUGH A SECOND INDUCTANCE TO THE ELECTRICAL LOAD, WHEREIN A THIRD INDUCTANCE BETWEEN THE FIRST DATA-LINE CONDUCTOR AND THE SECOND DATA-LINE CONDUCTOR IS GREATER THAN THE FIRST INDUCTANCE AND THE SECOND INDUCTANCE

506
CARRY A RETURN CURRENT FROM THE ELECTRICAL LOAD TO THE ELECTRONIC SYSTEM VIA A CONDUCTIVE SUPPORT STRUCTURE

702
COUPLE, USING A FIRST INDUCTOR, AN ELECTRICAL LOAD TO A FIRST DATA-LINE CONDUCTOR OF A DATA INTERFACE TO RECEIVE POWER FROM AN ELECTRONIC SYSTEM

704
COUPLE, USING A SECOND INDUCTOR, THE ELECTRICAL LOAD TO A SECOND DATA-LINE CONDUCTOR OF THE DATA INTERFACE TO RECEIVE POWER FROM THE ELECTRONIC SYSTEM, WHEREIN THE FIRST INDUCTOR AND THE SECOND INDUCTOR ARE MAGNETICALLY COUPLED SUCH THAT A FIRST MAGNETIC FLUX PRODUCED BY A FIRST CURRENT THROUGH THE FIRST INDUCTOR OPPOSES A SECOND MAGNETIC FLUX PRODUCED BY A SECOND CURRENT THROUGH THE SECOND INDUCTOR

706
CARRY A RETURN CURRENT FROM THE ELECTRICAL LOAD TO THE ELECTRONIC SYSTEM VIA A RETURN CONDUCTIVE PATH EXTERNAL TO THE DATA INTERFACE

FIG. 7

INDUCTORS FOR POWER OVER DATA LINE CIRCUITS

CROSS-REFERENCE TO RELATED APPLICATION(S)

This application claims the benefit of U.S. Patent Application No. 62/561,293, filed on Sep. 21, 2017, and U.S. Patent Application No. 62/614,041, filed on Jan. 5, 2018, which are incorporated herein by reference in their entirety.

TECHNICAL FIELD

This disclosure relates to inductors for power over data line circuits.

BACKGROUND

Wired data interfaces or networks, such as Ethernet and others, each provide a standardized hardware construct by which digital information may be passed between two discrete devices, including, but not limited to, computers, printers, and other electronic devices that intercommunicate. As some devices employing such interfaces have become physically smaller while still consuming a significant amount of power, some developers have employed one or more interface conductors, such as dedicated power and ground (return) lines or unused data-line conductors, to carry power to these devices to avoid the need for an additional power supply incorporated within, or located near, each of the devices.

SUMMARY

Disclosed herein are implementations of inductors for power over data line circuits.

In a first aspect, the subject matter described in this specification can be embodied in an apparatus that includes a magnetic core; a first conductive coil wound in a first winding direction around the magnetic core; a second conductive coil wound in a second winding direction around the magnetic core; a first conductive lead connecting a first end of the first conductive coil to a first pin; a second conductive lead connecting a second end of the first conductive coil to a second pin; a third conductive lead connecting a first end of the second conductive coil to a third pin, wherein a length of the first conductive lead is equal to a length of the third conductive lead; and a fourth conductive lead connecting a second end of the second conductive coil to a fourth pin, wherein a length of the second conductive lead is equal to a length of the fourth conductive lead.

In a second aspect, the subject matter described in this specification can be embodied in an apparatus for coupling power over data-line conductors. The apparatus includes a magnetic core; a first conductive coil wound around the magnetic core; a second conductive coil wound around the magnetic core; a first conductive lead connecting a first end of the first conductive coil to a first pin; a second conductive lead connecting a second end of the first conductive coil to a second pin; a third conductive lead connecting a first end of the second conductive coil to a third pin; and a fourth conductive lead connecting a second end of the second conductive coil to a fourth pin; an electronic component body made of an insulator that fastens the magnetic core, the first pin, the second pin, the third pin, and the fourth pin; and a circuit board including: four pads respectively connected to the first pin, the second pin, the third pin, and the fourth pin; and a first data-line trace and a second data-line trace that are oriented parallel to a length of the magnetic core around which the first conductive coil and the second conductive coil are wound.

In a third aspect, the subject matter described in this specification can be embodied in an apparatus for coupling electrical power over data-line conductors. The apparatus includes a magnetic core; a first conductive coil wound in a first winding direction around the magnetic core; a second conductive coil wound in a second winding direction around the magnetic core, wherein the first winding direction is opposite of the second winding direction; a first data-line conductor that is connected to the first conductive coil, wherein the first conductive coil couples electrical power over the first data-line conductor; a second data-line conductor that is connected to the second conductive coil, wherein the second conductive coil couples electrical power over the first data-line conductor; and a common ground return path configured to carry return current corresponding to the electrical power coupled over the first data-line conductor and to electrical power coupled over the second data-line conductor, wherein the first data-line conductor and the second data-line conductor are also configured to carry a differential data signal for a data interface.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is a flowchart of an example of a method of delivering power over first and second data-line conductors of a data interface to an electronic system.

FIG. 5 is a flowchart of an example of a method of extracting power from first and second data-line conductors of a data interface.

FIG. 7 is a flow diagram of another example of a method of extracting power from first and second data-line conductors of a data interface.

DETAILED DESCRIPTION

Figure 1:
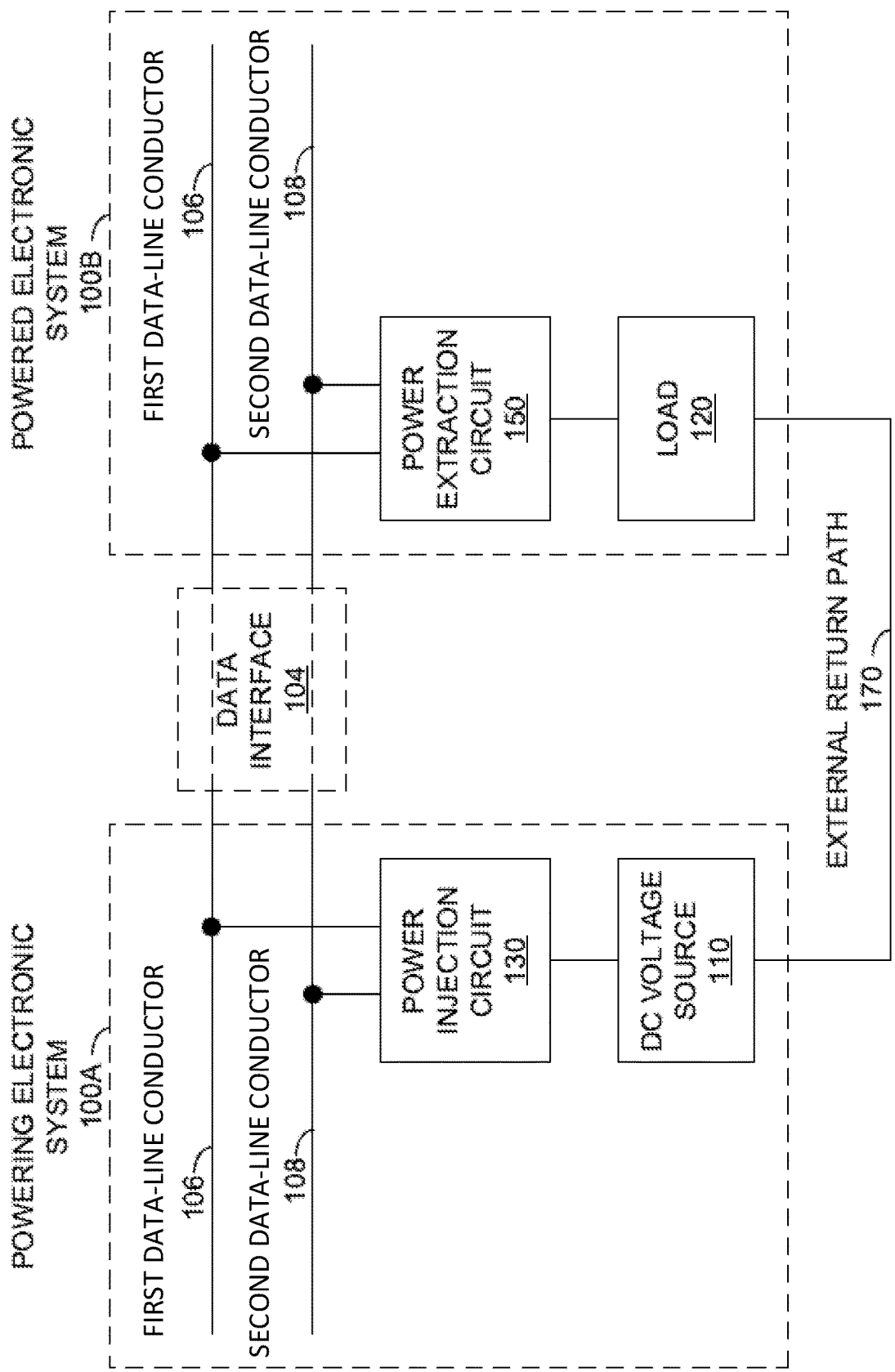
FIG. 1 is a block diagram of example circuits for delivering and receiving power over first and second data-line conductors of a data interface.

Described herein are apparatuses, circuits, and methods that may be used for transmitting and receiving electrical power over data-line conductors used for transmitting and/or receiving communication signals. A problem that arises in these power over data line applications is mode conversion, where asymmetry between the data-line conductors in a transmission circuit causes a portion of a common mode signal (e.g., an external electromagnetic interference coupled to the line) to be coupled and converted to a differential mode signal, which may interfere with differential-mode signals (e.g., differential mode signals used for communication) being transmitted over the data-line conductors. The mode conversion problem can be particularly significant where a common mode signal on data-line conductors is large. Magnetically coupled inductors and associated circuitry for power injection and power extraction with low mode conversion are described below.

Power over data line with common ground return (e.g., with chassis return) circuits may be built with pairs of magnetically coupled inductors in destructive flux configurations (e.g., where magnetic flux produced by current from a power source in a first inductor opposes the magnetic flux produced by current from the power source in a second inductor). Destructive flux configurations for pairs of magnetically coupled inductors in a power injection circuit or a power extraction circuit introduce significant mode conversion to the transmission line system. A feature of coupled inductors that may be used in such a destructive flux configuration is to have the conductive coils of the two inductors wound in opposite directions around a common magnetic core. In some implementations, entry positions and/or approach angles and exit positions and/or approach angles for the conductive leads of the conductive coils to the common magnetic core may be made symmetric, which may serve to reduce mode conversion caused by the coupled inductors.

Low mode conversion in a pair of magnetically coupled inductors may be achieved by having symmetric conductive leads connecting the pin terminals of a coupled inductor device to the conductive coils of the coupled inductors. Slots in an electronic component body of the coupled inductor device may be used to facilitate the use of four conductive leads with equal lengths and/or symmetry about a plane through the center of the coupled inductor device.

Another potential source of mode conversion is asymmetric magnetic coupling between inductors used for power injection or power extraction and transmission line traces on a circuit board that bear differential data signals near the inductors. This type of mode conversion may be mitigated by orienting the length of a magnetic core of the couple inductors, around which their conductive coils are wound, parallel to the data-line traces that approach the coupled inductor device on the circuit board. This type of mode conversion may also be mitigated by fastening a ferrite plate over the data-line traces near the couple inductor device. In some implementations, this type of mode conversion may also be mitigated by mounting the coupled inductors device on an opposite side of a circuit board from the data-line traces and/or interposing a ground plane on an inner layer between them.

Aspects of this disclosure involve power over data line circuits and methods for delivering and receiving electrical power over at least two data-line conductors of a data interface. These circuits and methods do not require the use of dedicated power and/or ground or reference lines, and need not employ unused data-line conductors of the interface. The data-line conductors employed to provide power may be single-ended or differential in nature, and may constitute any type of data interface employing two or more data-line conductors. In some embodiments, delivery and reception of electrical power may be accomplished utilizing only two data-line conductors. In particular examples discussed herein, the data interface being utilized for power transmission is a single-channel Ethernet interface that employs only two conductors, namely first and second differential data-line conductors. In these examples, both conductors may be employed to supply power, while a chassis or other conductive support structure may provide the current return path.

In some implementations, the circuits and methods disclosed herein inject power onto data-line conductors, as well as extract the injected power from those data-line conductors, by way of inductances. Proper inductance across the two data-line conductors improves impedance matching for better data transmission performance (e.g., higher overall data channel bandwidth) due to less attenuation of the data signals. These embodiments may employ two data interface lines to reduce the amount of wiring utilized while supplying a significant amount of power or current.

As used in this document, "pin" refers to an electrical contact or terminal (e.g., a ball of a ball grid array, a pin of a quad flat package, a through-hole pin, etc.) of an electronic component, such as a through-hole component or a surface mount component.

FIG. 1 is a block diagram of example circuits for delivering and receiving power over first and second data-line conductors of a data interface. In the example of FIG. 1, a powering electronic system 100A provides power to a powered electronic system 100B by way of a first data-line conductor 106 and a second data-line conductor 108 of a data interface 104. Generally, the data interface 104 may be any communications pathway that includes at least two data-line conductors (e.g., the first data-line conductor 106 and the second data-line conductor 108 shown in FIG. 1) connecting two different circuits, devices, or systems. As mentioned above, the first data-line conductor 106 and the second data-line conductor 108 may be corresponding differential data-line conductors of a single-channel data interface, such as single-channel Ethernet. However, other types of data interfaces that employ two or more data interface lines may be configured and/or operated according to the various circuits and methods described herein. Further, data may be carried over the first data-line conductor 106 and the second data-line conductor 108 in either or both directions (e.g., from the powering electronic system 100A to the powered electronic system 100B, and/or vice-verse).

The powering electronic system 100A is configured to provide power via the data interface 104, and the powered electronic system 100B is configured to receive that power via the data interface 104. The powering electronic system 100A and the powered electronic system 100B may be any electronic device, unit, or system capable of connecting to the data interface 104. Further, each of the powering electronic system 100A and the powered electronic system 100B may or may not be capable of transmitting and/or receiving data via the data interface 104. Each of the powering electronic system 100A and the powered electronic system 100B may include components that are located within a single housing or enclosure, or components that may be distributed among two or more such housings or enclosures and interconnected electrically. Examples of such electronic systems 100A and 100B may include, but are not limited to, data processing systems, control systems, sensors, actuators, displays, input/output (I/O) devices, and so on. In the particular examples discussed herein, a single powering electronic system 100A provides power to a single powered electronic system 100B. However, in some embodiments, one or more powering electronic systems 100A may provide power to multiple powered electronic systems 100B by way of a discrete pair of data-line conductors to each of the powered electronic systems 100B, or by way of a single pair of data-line conductors shared by the powering electronic systems 100A and the powered electronic systems 100B.

As illustrated in FIG. 1, the powering electronic system 100A may include a DC voltage source 110 that is configured to inject power onto both the first data-line conductor 106 and the second data-line conductor 108 by way of a power injection circuit 130, examples of which are described below in conjunction with FIGS. 2 and 3. In a particular example, the DC voltage source 110 may provide a DC supply voltage of 48 VDC (volts DC). However, many other DC voltage levels higher and lower than 48 VDC may be utilized in other embodiments.

Also in FIG. 1, the powered electronic system 100B may include a power extraction circuit 150 that extracts DC electrical power being provided over the data interface 104 via the first data-line conductor 106 and the second data-line conductor 108 and directs that power to an electrical load 120 of the powered electronic system 100B. In at least some examples, the electrical load 120 may be any electrical or electronic circuitry, including digital and/or analog circuitry, employed by the powered electronic system 100B to perform one or more functions with which the powered electronic system 100B is tasked. Such functions may or may not include the transmission, reception, encoding, decoding, encrypting, decrypting, and/or processing of the data carried over the first data-line conductor 106 and the second data-line conductor 108. Such functions also may or may not include functions not involved in or related to the transmission and/or reception of data. For example, the powered electronic system 100B may use the data interface 104 strictly to receive and utilize power from the powering electronic system 100A, and not for any data-specific functions, such as the transmission or reception of data via the data interface 104.

While the powering electronic system 100A employs both the first data-line conductor 106 and the second data-line conductor 108 for transmitting or providing power to the powered electronic system 100B, additional data-line conductors or other conductors specifically associated with the data interface 104 may not be available to provide a return path for the power being consumed by the electrical load 120. In such examples, such as the one specifically depicted in FIG. 1, the powered electronic system 100B employs an external return path 170 that does not constitute part of the data interface 104 to couple the electrical load 120 with a ground reference of the DC voltage source 110 or return side of the DC voltage source 110. In some embodiments, the powering electronic system 100A and the powered electronic system 100B may be mounted on the same chassis or other conductive support structure. In one particular example, the conductive support structure may be a vehicle chassis, such as a chassis of a passenger car, truck, sport utility vehicle, commercial or industrial vehicle, motorcycle, motor scooter, or the like. Other examples include a boat frame or hull, and a plane fuselage. In other implementations, any kind of conductive return path, including those that may or may not be specifically associated with the data interface 104 (e.g. any kind of conductive building infrastructure), may be employed as the external return path 170.

While the particular embodiments of FIG. 1, as well as others described herein, involve the use of two data-line conductors of a data interface to deliver power, any number of pairs of data-line conductors may carry power from one electronic system to another in other examples.

Figure 2:
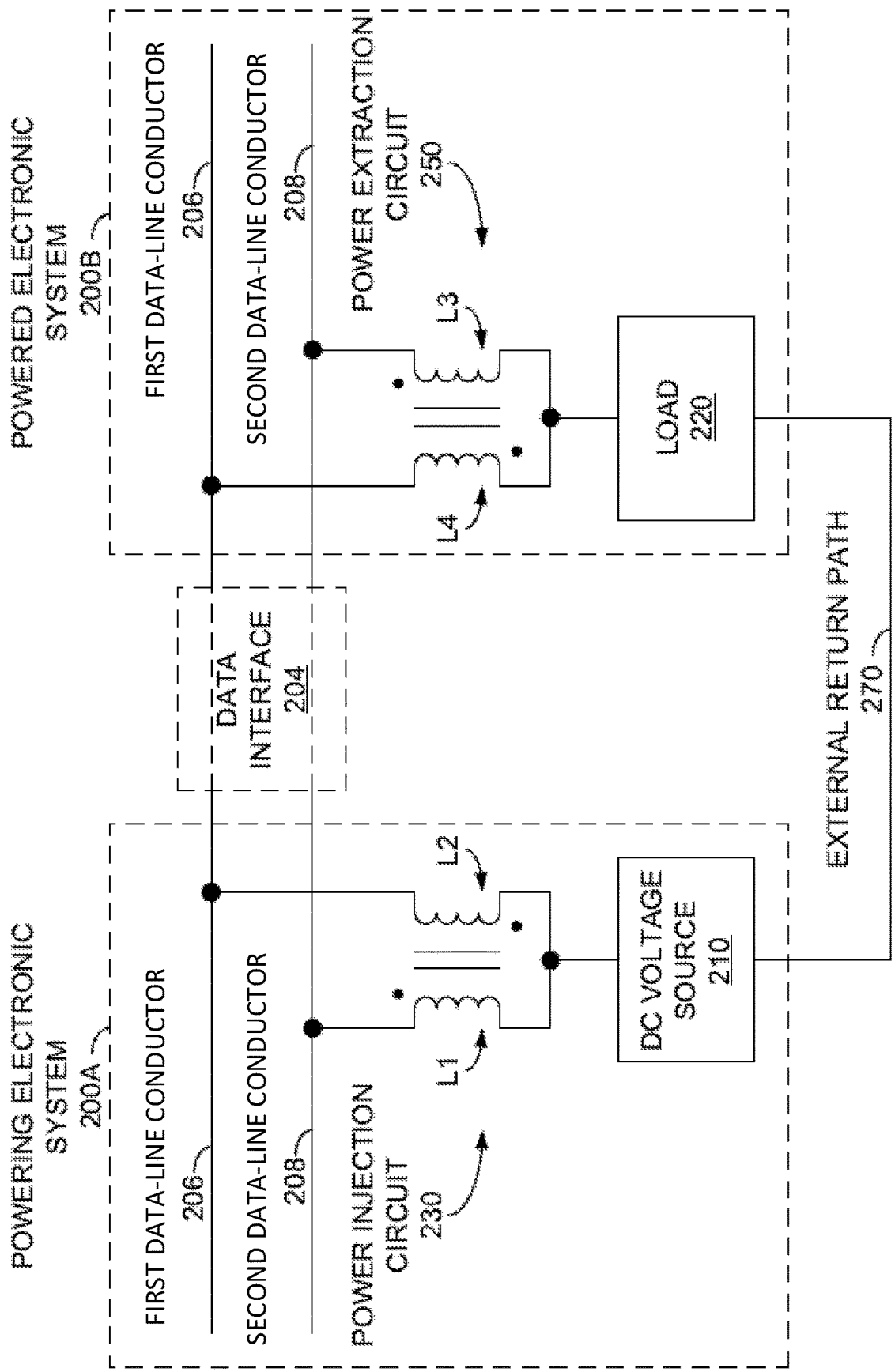
FIG. 2 is a block diagram of additional example circuits for delivering and receiving power over first and second data-line conductors of a data interface.

FIG. 2 is a block diagram of additional example circuits for delivering and receiving power over first and second data-line conductors of a data interface. In the particular example of FIG. 2, a powering electronic system 200A provides power from a DC voltage source 210 over a data interface 204 to an electrical load 220 of a powered electronic system 200B, in a manner similar to that described above in relation to FIG. 1. Also similar to the circuits of FIG. 1, the powering electronic system 200A employs a power injection circuit 230 to inject power from the DC voltage source onto both a first data-line conductor 206 and a second data-line conductor 208 of the data interface 204, while the powered electronic system 200B extracts that power from the first data-line conductor 206 and the second data-line conductor 208 using a power extraction circuit 250.

In the embodiment of FIG. 2, the power injection circuit 230 of the powering electronic system 200A includes a first inductor L1 and a second inductor L2. Correspondingly, the power extraction circuit 250 of the powered electronic system 200B includes a third inductor L3 and a fourth inductor L4. In other examples, the power injection circuit 230 and/or the power extraction circuit 250 may include additional components or devices to supplement or augment the operation of the inductors L1-L4.

In FIG. 2, a DC supply voltage of the DC voltage source 210 facilitates an electrical current on a first conductive path through the first inductor L1 onto the second data-line conductor 208. Similarly, the supply voltage of the DC voltage source 210 causes an electrical current on a second conductive path through the second inductor L2 onto the first data-line conductor 206 that parallels the first conductive path. Additionally, as illustrated in FIG. 2, the first inductor L1 and the second inductor L2 are magnetically coupled such that a first magnetic flux produced by the current in the first conductive path that is caused by the DC voltage source 210 opposes a second magnetic flux produced by the current in the second conductive path that is caused by the DC voltage source 210. In one particular example in which the inductance of the first inductor L1 equals the inductance of the second inductor L2, the two inductances cancel from the viewpoint of the DC voltage source 210, possibly resulting in an extremely low (e.g., near-zero) inductance along both the first conductive path and the second conductive path. In at least some embodiments, the first inductor L1 and the second inductor L2 are wound around a common core to magnetically couple the inductors L1 and L2, thus reducing the space or footprint occupied by the inductors L1 and L2 as opposed to employing separate cores for the inductors L1 and L2.

At the same time, the first inductor L1 and the second inductor L2 appear in series as a third conductive path connecting the first data-line conductor 206 and the second data-line conductor 208 at the powering electronic system 200A. Consequently, in the third conductive path, the magnetic coupling of the first inductor L1 and the second conductor L2 creates an augmentation of the inductances of that path, thus potentially providing better impedance matching, which may be especially important at lower frequencies or data rates for the data signals carried over the first data-line conductor 206 and the second data-line conductor 208. As a result, from the perspective of the first data-line conductor 206 and the second data-line conductor 208 at the powering electronic system 200A, the inductance along the third conductive path may be a sum of the inductance of the first inductor L1, the inductance of the second inductor L2, and the mutual inductance of the first inductor L1 and the second inductor L2. In the specific example of the inductances of the first inductor L1 and the second inductor L2 being equal, the total inductance along the third conductive path may be approximately four times the inductance of the first inductor L1 or the second inductor L2, depending upon the actual values of the first inductor L1 and the second inductor L2, in addition to other characteristics of the power injection circuit 230.

At the powered electronic system 200B, the third inductor L3 and the fourth inductor L4 may be configured in a manner similar to the first inductor L1 and the second inductor L2, respectively. Consequently, within the powered electronic system 200B, the DC voltage impressed onto the first data-line conductor 206 and the second data-line conductor 208 by the DC voltage source 210 at the powering electronic system 200A results in a first current in a first conductive path from the first data-line conductor 206 through the fourth inductor L4 to the electrical load 220 and a second current in a second conductive path from the second data-line conductor 208 through the third inductor L3 to the electrical load 220. In addition, the third inductor L3 and the fourth inductor L4 are magnetically coupled such that a first magnetic flux produced by the current in the first conductive path that is caused by the DC voltage source 210 opposes a second magnetic flux produced by the current in the second conductive path that is caused by the DC voltage source 210. In one example in which the inductance of the third inductor L3 equals the inductance of the fourth inductor L4, the two inductances cancel from the viewpoint of the electrical load 220, possibly resulting in an extremely low inductance along both the first conductive path and the second conductive path of the powered electronic system 200B.

Simultaneously, the third inductor L3 and the fourth inductor L4 appear in series as a third conductive path between the first data-line conductor 206 and the second data-line conductor 208 at the powered electronic system 200B. Therefore, in the third conductive path, the magnetic coupling of the third inductor L3 and the fourth conductor L4 creates an enhancement of the inductances of that path, thus possibly providing more effective impedance matching, especially at lower data signaling rates on the first data-line conductor 206 and the second data-line conductor 208. As a result, from the perspective of the first data-line conductor 206 and the second data-line conductor 208 at the powered electronic system 200B, the inductance along the third conductive path may be a sum of the inductance of the third inductor L3, the inductance of the fourth inductor L4, and the mutual inductance of the third inductor L3 and the fourth inductor L4. In a particular example of the inductances of the third inductor L3 and the fourth inductor L4 being equal, the total inductance along the third conductive path may be approximately four times the inductance of the third inductor L3 or the fourth inductor L4, depending upon the actual values of the third inductor L3 and the fourth inductor L4, as well as other characteristics of the power extraction circuit 250.

Figure 3:
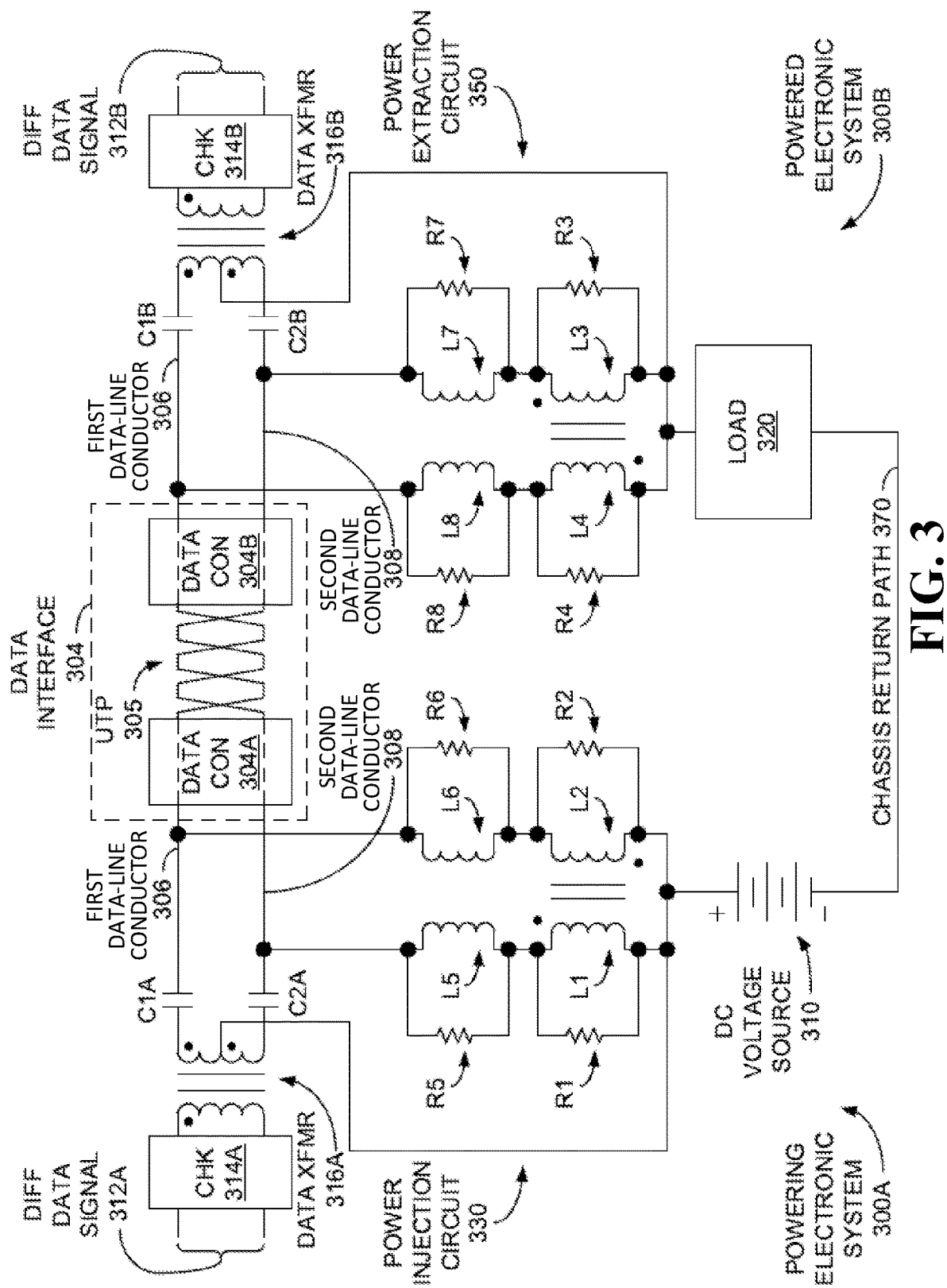
FIG. 3 is a block diagram of further example circuits for delivering and receiving power over first and second data-line conductors of a data interface.

FIG. 3 is a block diagram of further example circuits for delivering and receiving power over first and second data-line conductors of a data interface. More specifically, FIG. 3 depicts a powering electronic system 300A configured to supply electrical power to a powered electronic system 300B by way of a data interface 304 that includes a first data connector 304A of the powered electronic system 300A and a second data connector 304B of the powered electronic system 300B that are interconnected by way of a single unshielded twisted pair (UTP) cable 305, as what may be found in a single-channel Ethernet interface. Typically, a UTP cable is employed to cancel out noise currents induced into the twisted conductor pair by magnetic radiation from an external source. In other examples, other types of data interfaces, including those that employ shielded twisted pair (STP) cable, untwisted cable, and so on, may be employed in the data interface 304.

Regarding the transmission of data, the powering electronic system 300A transmits and/or receives data signals as differential data signals 312A. When transmitting, the differential data signals 312A may be passed via a common mode choke 314A to a data transformer 316A. The common mode choke 314A is configured to pass differential signals without significant attenuation, and to heavily attenuate common mode noise, thus blocking noise from being passed to the data transformer 316A. In turn, the data transformer 316A is configured to provide galvanic isolation between the powering electronic system 300A and the data interface 304, as well as to provide some common mode rejection and to help protect the powering electronic system 300A against circuit faults on the data interface 304. In some examples, the position of the common mode choke 314A and the data transformer 316A may be reversed, such that a transmitted differential data signal 312A is passed through the data transformer 316A prior to the common mode choke 314A before proceeding to the data connector 304A. In other embodiments, two common mode chokes 314A and two data transformers 316A may be employed in the powering electronic system 300A, one each for transmitting data and one each for receiving data over the first data-line conductor 306 and the second data-line conductor 308.

In the example of FIG. 3, the powering electronic system 300A may also include a first capacitor C1A coupling an outer tap of the data transformer 316A to the first data-line conductor 306 and a second capacitor C2A coupling the other outer tap of the data transformer 316A to the second data-line conductor 308. The capacitors C1A and C2A may be utilized to provide DC isolation between the differential data signal 312A and the DC power being supplied by a DC voltage source 310 by way of a power injection circuit 330. In one example, the capacitors C1A and C2A may each have a value of 0.01 microfarads (u F), but other values for the capacitors C1A and C2A may be utilized in other embodiments. In yet other examples, the capacitors C1A and C2A may not be employed in the powering electronic system 300A.

Similarly, the powered electronic system 300B provides and/or receives differential data signals 312B via one or more of a common mode choke 314B, a data transformer 316B, and capacitors C1B and C2B, which may be configured and operated in a manner similar to the common mode choke 314A, the data transformer 316A, and the capacitors C1A and C2A of the powering electronic system 300A, as described above.

The DC voltage source 310 of the powering electronic system 300A may be a voltage source that powers both the powering electronic system 300A and the powered electronic system 300B, or may be a source separate and distinct from another voltage source (not shown in FIG. 3) powering the powering electronic system 300A. In one example, the DC voltage source 310 may be a 48 VDC voltage source; however, higher or lower output voltages for the DC voltage source 310 may be employed in other examples, depending at least in part on the particular power needs of the powered electronic system 300B. In yet other embodiments, the output voltage level of the DC voltage source 310 may be controlled, and thus varied over time, by a power management system. For example, the power management system may lower the output voltage level during standby or other low-power periods.

In the specific example of FIG. 3, the positive (output) terminal of the DC voltage source 310 is connected to a center output tap of the data transformer 316A. This connection biases the outer taps of the data transformer 316A to the output voltage of the DC voltage source 310, thereby matching the DC components of the signals being output from the data transformer 316A, and thus the attached ends of the first capacitor C1A and the second capacitor C2A, with the DC component of the signals on the first data-line conductor 306 and the second data-line conductor 308 at the data connector 304A, therefore maintaining approximately zero VDC across the capacitors C1A and C2A, depending on the windings, core, and other characteristics of the data transformer 316A. Connecting the center tap to the DC voltage source 310 in such a manner may be particularly beneficial if the capacitors C1A and C2A are ceramic capacitors, whose capacitance may vary significantly with increasing DC voltage imposed across the capacitors C1A and C2A. In other examples, the center output tap of the data transformer 316A may be tied to another voltage, such as ground, or may be left floating. Likewise, the center output tap of the data transformer 316B of the powered electronic system 300B may be coupled to the electrical load 320, or may be connected to another voltage reference or left floating in a manner matching that of the powering electronic system 300A.

As depicted in the FIG. 3, the power injection circuit 330 of the powering electronic system 300A may include several components, including inductors L1, L2, L5, and L6, as well as resistors R1, R2, R5, and R6. For example, a first inductor L1 and a second inductor L2 may be magnetically coupled in a manner similar to that of the first inductor L1 and the second inductor L2 described above in conjunction with FIG. 2. As a result, the inductances of inductors L1 and L2 may tend to negate one another from the viewpoint of the DC voltage source 310 through the first inductor L1 and the second inductor L2 to the first data-line conductor 306 and the second data-line conductor 308, thus providing relatively low inductance paths through the inductors L1 and L2. Oppositely, along the path from the first data-line conductor 306 through inductors L1 and L2 to the second data-line conductor 308, the differential data signal 312A would encounter the sum of the inductances of the first inductor L1 and the second inductor L2, in addition to the mutual inductance of the first inductor L1 and the second inductor L2, resulting in enhanced impedance matching, especially at lower data rate ranges. In at least some examples, the inductances of the first inductor L1 and the second inductor L2 are equal, resulting in a near-zero inductance from the viewpoint of the DC voltage source 310. Further, the powered electronic system 300B may include a third inductor L3 and a fourth inductor L4 that operate in a manner similar to that of the third inductor L3 and the fourth inductor L4 of FIG. 2 by providing lesser inductance values for the paths from the first data-line conductor 306 and the second data-line conductor 308 to the electrical load 320 than for the path between the first data-line conductor 306 and the second data-line conductor 308 across which the differential data signal 312B is applied.

In the embodiment of FIG. 3, an additional pair of inductors (a fifth inductor L5 and a sixth inductor L6) may be included in the power injection circuit 330, with the fifth inductor L5 placed in series with the first inductor L1, and the sixth inductor L6 positioned in series with the second inductor L2. In at least some examples, the additional inductors L5 and L6 may provide an impedance match corresponding to a different frequency band of the differential data signal 312A compared to that associated with the first inductor L1 and the second inductor L2. For example, the inductance values of the first inductor L1 and the second inductor L2 may be set such that they provide a selected or desired impedance for the differential data signal 312A over a first frequency range, while the inductance values of the fifth inductor L5 and the sixth inductor L6 may be set so that they provide a selected impedance for the differential data signal 312A over a second frequency range. In one particular example, the inductance value of each of the first inductor L1 and the second inductor L2 is selected to be 22 microhenries ($\mu$H), while the inductance value of each of the fifth inductor L5 and the sixth inductor L6 may be selected to be 1 $\mu$H. In some embodiments, these particular values result in the first inductor L1 and the second inductor L2 providing a desired impedance for impedance matching purposes over a frequency range of 10 megahertz (MHz) to 40 MHz, or possibly 1 MHz to 40 MHz, while the fifth inductor L5 and the sixth inductor L6 provide a selected impedance over a higher frequency range of 40 MHz and above.

As depicted in FIG. 3, while the first inductor L1 and the second inductor L2 are magnetically coupled (e.g., wound around a single core), the fifth inductor L5 and the sixth inductor L6 are not magnetically coupled. In at least some examples, such as the particular embodiment described above, magnetically coupling the fifth inductor L5 and the sixth inductor L6 would not be exceptionally desirable since the size of the fifth inductor L5 and the sixth inductor L6 (1 $\mu$H) is much smaller than the size of the first inductor L1 and the second inductor L2 (22 $\mu$H), thus not adding an appreciable amount of inductance to the conductive paths from the DC voltage source 310 to the first data-line conductor 306 and the second data-line conductor 308. Moreover, using a common core for the fifth inductor L5 and the sixth inductor L6 may increase parasitic capacitance between the coupled inductors L5 and L6, especially for the higher frequency range associated with these inductors L5 and L6. Such inter-winding capacitance may be, for example, 5 picofarads (pF), which may be significant at higher data transfer frequencies. However, in some examples, the fifth inductor L5 and the sixth inductor L6 may be magnetically coupled in a manner similar to that of the first inductor L1 and the second inductor L2. In some examples, more than the two sets of inductors (L1, L2, L5, and L6) may be employed in other embodiments in order to address a higher number of frequency ranges.

In the specific example illustrated in FIG. 3, each inductor L1, L2, L5, and L6 of the power injection circuit 330 is connected in parallel with a corresponding resistor R1, R2, R5, and R6, respectively. In at least some embodiments, each of the resistors R1, R2, R5, and R6 is employed to dampen resonance in its associated inductor L1, L2, L5, and L6, especially near the mid-band of the frequencies associated with the differential data signal 312A (e.g., the frequencies between the first frequency band associated with the first inductor L1 and the second inductor L2, and the second frequency band associated with the fifth inductor L5 and the sixth inductor L6). In at least some scenarios, such resonance may be caused by the inductors L1, L2, L5, and L6 and their associated parasitic capacitances. In this case, presuming a midband frequency of 40 MHz using the particular inductance values for the inductors L1, L2, L5, and L6 indicated above, each of the first resistor R1 and the second resistor R2 may be selected to have a resistance of 8 kilohms (kΩ), while the fifth resistor R5 and the sixth resistor R6 each may have a resistance of 400 ohms (Ω).

While particular frequency ranges, inductance values, and capacitances values are specified above in conjunction with the embodiment of FIG. 3, other values for these same characteristics may be utilized in other embodiments.

As with the embodiment of FIG. 2, inductors L3, L4, L7, and L8, and resistors R3, R4, R7, and R8 of the power extraction circuit 350 of the powered electronic system 300B may be employed in a corresponding manner to the inductors L1, L2, L5, and L6, and resistors R1, R2, R5, and R6, respectively, of the powering electronic system 300A. Moreover, the particular component values of each of the inductors L3, L4, L7, and L8, and resistors R3, R4, R7, and R8 may match the value of its counterpart component (inductors L1, L2, L5, and L6, and resistors R1, R2, R5, and R6) in at least some embodiments, although the values of the various components need not be so constrained in other examples.

In the case of the data interface 304 being a two-conductor, single-channel Ethernet or similar interface, the maximum DC current of a single conductor (e.g., the first data-line conductor 306 or the second data-line conductor 308) may be, for example, 2.5 amperes (A). Accordingly, the powering electronic system 300A, by employing both the first data-line conductor 306 and the second data-line conductor 308, may provide a total of 5 A of DC current to power the powered electronic system 300B, given that a chassis return path 370 external to the data interface 304 is provided. Further, the total amount of power provided by the powering electronic system 300A may depend on the output voltage level of the DC voltage source 310. For example, a voltage level of 48 VDC, at a maximum DC current provided of 5 A, may result in a maximum power of 240 watts (W) deliverable to the powered electronic system 300B.

FIGS. 4 through 7 provide flow diagrams of various methods of delivering power to, or receiving power from, an electronic system via a data interface. In each example, references are made to the particular circuits of FIG. 2 to facilitate understanding of the methods. However, other circuits (e.g., the circuits of FIG. 3) that perform these same or similar methods may be employed in other embodiments. Also, while each of the methods of FIGS. 4 through 7 indicate that each operation therein is performed in a particular order of execution, the operations may be performed simultaneously or concurrently over some continuous period of time, as is described above in relation to the circuit embodiments of FIGS. 1 through 3.

FIG. 4 is a flow diagram of an example of a method 400 of delivering power over first and second data-line conductors (e.g., the first data-line conductor 206 and the second data-line conductor 208) of a data interface (e.g., data interface 204) to an electronic system (e.g., the powered electronic system 200B). In the method 400, a first current from a DC voltage source (e.g., the DC voltage source 210) may be supplied through a first inductance (e.g., the first inductor L1) to the first data-line conductor for transmission to the electronic system (operation 402). Also, a second current may be supplied from the DC voltage source through a second inductance (e.g., the second inductor L2) to the second data-line conductor for transmission to the electronic system (operation 404). Accordingly, a third inductance (e.g., a series combination of the first inductor L1 and the second inductor L2) between the first data-line conductor and the second data-line conductor may be greater than the first inductance and the second inductance. In addition, a return current may be carried from the electronic system to the DC voltage source via a conductive support structure (e.g., the external return path 270) (operation 406).

FIG. 5 is a flow diagram of an example of a method 500 of extracting power from first and second data-line conductors (e.g., the first data-line conductor 206 and the second data-line conductor 208) of a data interface (e.g., the data interface 204), wherein the power is provided by an electronic system (e.g., the powering electronic system 200A). In the method 500, a first current may be supplied from the electronic system via the first data-line conductor through a first inductance (e.g., the fourth inductor L4) to an electrical load (e.g., the electrical load 220) (operation 502). A second current may be supplied from the electronic system via the second data-line conductor through a second inductance (e.g., the third inductor L3) to the electrical load (operation 504). Consequently, a third inductance (e.g., a series combination of the third inductor L3 and the fourth inductor L4) between the first data-line conductor and the second data-line conductor may be greater than the first inductance and the second inductance. A return current may then be carried from the electrical load to the electronic system via a conductive support structure (e.g., the external return path 270) (operation 506).

Figure 6:
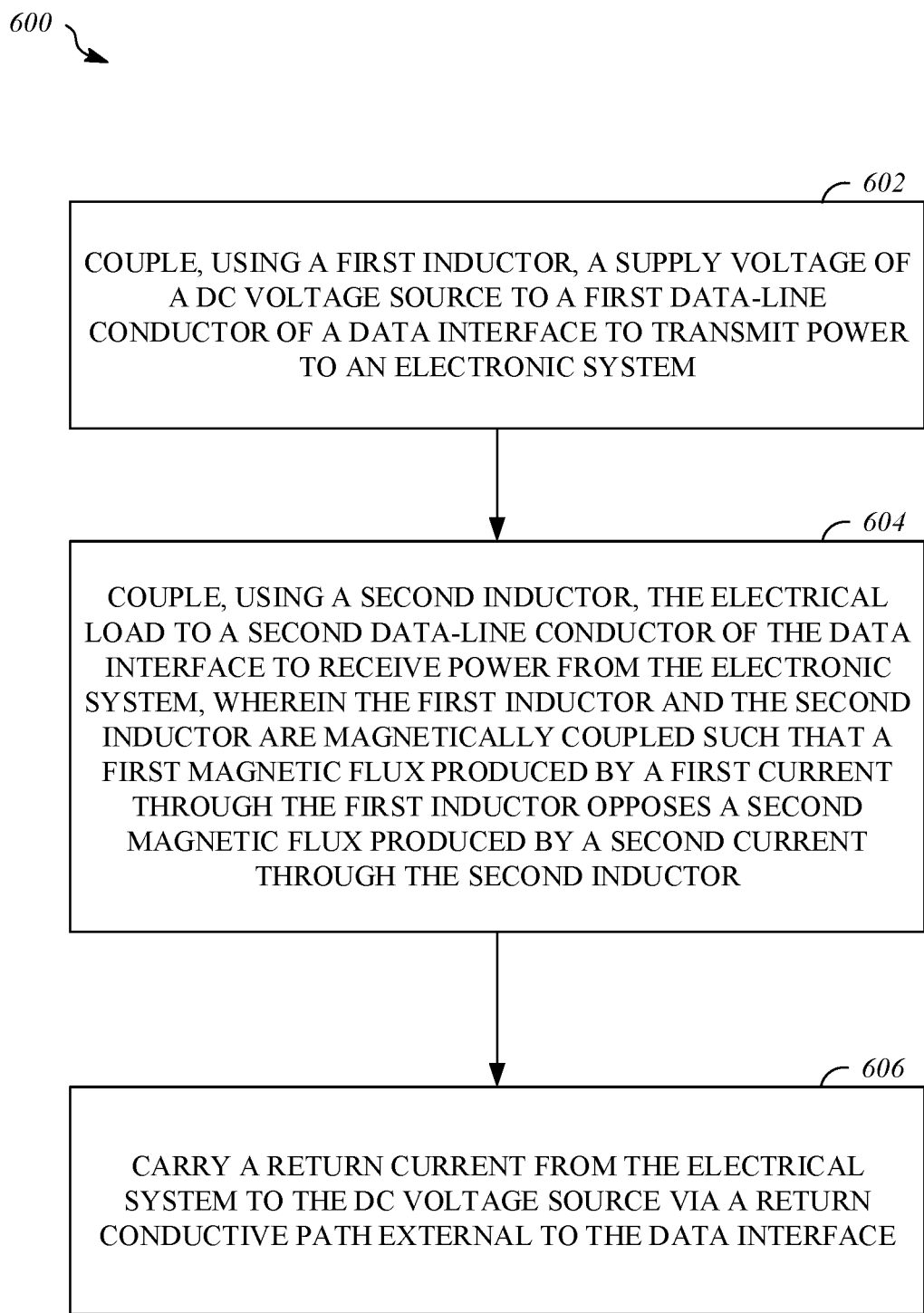
FIG. 6 is a flowchart of another example of a method of delivering power over first and second data-line conductors of a data interface to an electronic system.

FIG. 6 is a flow diagram of another example of a method 600 of delivering power over first and second data-line conductors (e.g., the first data-line conductor 206 and the second data-line conductor 208) of a data interface (e.g., the data interface 204) to an electronic system (e.g., the powered electronic system 200B). In the method 600, a first inductor (e.g., the second inductor L2) may be used to couple a supply voltage of a DC voltage source (e.g., the DC voltage source 210) to the first data-line conductor of the data interface to transmit power to the electronic system (operation 602). A second inductor (e.g., the first inductor L1) may be used to couple the supply voltage to the second data-line conductor of the data interface to transmit power to the electronic system (operation 604). In addition, the first inductor and the second inductor may be magnetically coupled such that a first magnetic flux produced by a first current through the first inductor opposes a second magnetic flux produced by a second current through the second inductor. A return current may be carried from the electronic system to the DC voltage source via a return conductive path external to the data interface (e.g., the external return path 270) (operation 606).

FIG. 7 is a flow diagram of another example of a method 700 of extracting power from first and second data-line conductors (e.g., the first data-line conductor 206 and the second data-line conductor 208) of a data interface (e.g., the data interface 204), wherein the power is provided by an electronic system (e.g., the powering electronic system 200A). In the method 700, a first inductor (e.g., the fourth inductor L4) may be used to couple an electrical load (e.g., the electrical load 220) to the first data-line conductor of the data interface to receive power from the electronic system (operation 702). Also, a second inductor (e.g., the third inductor L3) may be used to couple the electrical load to the second data-line conductor of the data interface to receive power from the electronic system (operation 704). In addition, the first inductor and the second inductor may be magnetically coupled such that a first magnetic flux produced by a first current through the first inductor opposes a second magnetic flux produced by a second current through the second inductor. A return current may be carried from the electrical load to the electronic system via a return conductive path external to the data interface (e.g., the external return path 270) (operation 706).

Figure 8:
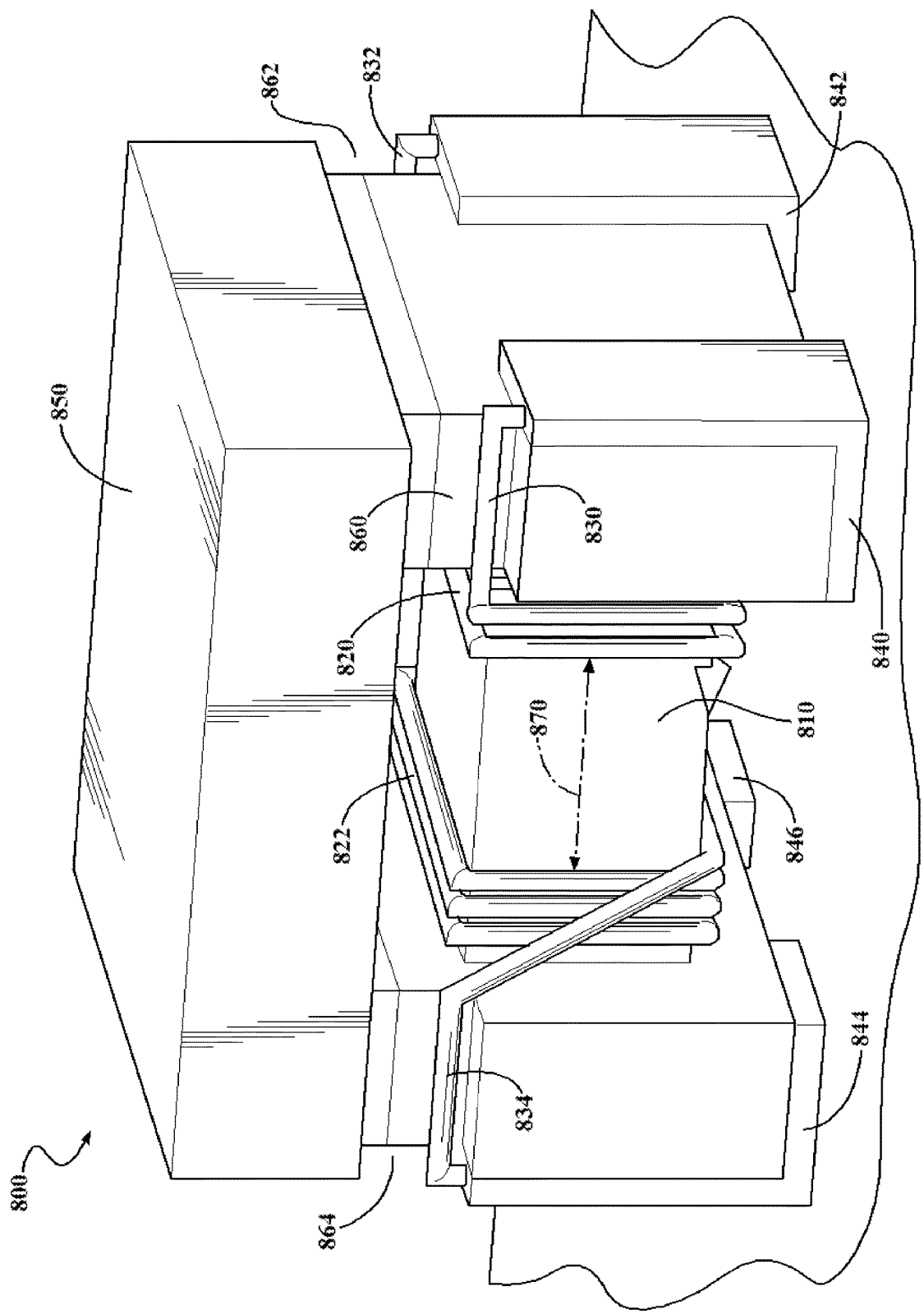
FIG. 8 is a drawing of an example of a device including a pair of inductors wound around a common magnetic core.

FIG. 8 is a drawing of an example of a device 800 including a pair of inductors wound around a common magnetic core. The device 800 includes a magnetic core 810; a first conductive coil 820 wound around the magnetic core 810; a second conductive coil 822 wound around the magnetic core 810; four conductive leads (830, 832, 834, (and 836—not shown)) that connects ends of the conductive coils (820 and 822) to four respective pins (840, 842, 844, and 846); and an electronic component body 850 that includes four slots (860, 862, 864, (and 866—not shown)) through which the four conductive leads (830, 832, 834, (and 836—not shown)) are respectively are respectively routed. For example, the device 800 may be used to implement the magnetically coupled inductors L1 and L2 of FIG. 2. For example, the device 800 may be used to implement the magnetically coupled inductors L3 and L4 of FIG. 2. For example, the device 800 may be used to implement the magnetically coupled inductors L1 and L2 of FIG. 3. For example, the device 800 may be used to implement the magnetically coupled inductors L3 and L4 of FIG. 3.

The device 800 includes the magnetic core 810. For example, the magnetic core 810 may be made of a material with high magnetic permeability. For example, the magnetic core 810 may be composed of a ferromagnetic metal (e.g., iron) or a ferrimagnetic compound (e.g., a ferrite). For example, the magnetic core 810 may be made of silicon steel or carbonyl iron. For example, the magnetic core 810 may include a rod shaped portion around which conductive coils may be wound.

The device 800 includes a first conductive coil 820 wound in a first winding direction (e.g., clockwise or counter-clockwise) around the magnetic core 810. The device 800 includes a second conductive coil 822 wound in a second winding direction (e.g., clockwise or counter-clockwise) around the magnetic core 810. In some implementations, the first winding direction is opposite of the second winding direction (e.g., the first is clockwise and the second is counter-clockwise). Having the windings in opposite directions may facilitate configurations (with proper pin assignments) of inductors with destructive flux magnetic coupling and low mode conversion. For example, the first conductive coil 820 and the second conductive coil 822 may be composed of a conductor such as copper. The first conductive coil 820 and the second conductive coil 822 may be spaced apart from each other on the magnetic core 810. The spacing 870 of the conductive coils (820 and 822) may be chosen reduce mode conversion for magnetically coupled inductor applications such as those depicted in FIG. 2 and FIG. 3 without making the device 800 too large. For example, a spacing 870 between the first conductive coil 820 and the second conductive coil 822 along a length of the magnetic core 810 is greater than two millimeters.

The device 800 includes a first conductive lead 830 connecting a first end of the first conductive coil 820 to a first pin 840. The device 800 includes a second conductive lead 832 connecting a second end of the first conductive coil 820 to a second pin 842. The device 800 includes a third conductive lead 834 connecting a first end of the second conductive coil 822 to a third pin 844. The device 800 includes a fourth conductive lead (836—not shown in FIG. 8) connecting a second end of the second conductive coil 822 to a fourth pin 846. A length of the first conductive lead 830 may be equal to a length of the third conductive lead 834. A length of the second conductive lead 832 may be equal to a length of the fourth conductive lead 836. Having the corresponding conductive leads of the two conductive coils (820 and 822) be equal lengths may create a symmetry of the device 800, which may reduce mode conversion for magnetically coupled inductor applications such as those depicted in FIG. 2 and FIG. 3. In some implementations, all four of the conductive leads (830-836) are a same length, and thus the length of the first conductive lead 830 is equal to the length of the fourth conductive lead 836.

The device 800 may be built with other symmetries to reduce mode conversion for magnetically coupled inductor applications such as those depicted in FIG. 2 and FIG. 3. For example, a first open circuit impedance of the first conductive coil 820 may be equal to a second open circuit impedance of the second conductive coil 822. For example, the device 800 may be symmetric about a plane bisecting the device 800, between the first pin 840 and the third pin 844, and between the second pin and the fourth pin (e.g., a plane through the center of the device 800 that is equidistant from all four pins (840-846)). For example, a first approach angle between the first conductive lead 830 and the magnetic core 810 is equal to a second approach angle between the third conductive lead 834 and the magnetic core 810, and a third approach angle between the second conductive lead 832 and the magnetic core 810 is equal to a fourth approach angle between the fourth conductive lead 836 and the magnetic core 810. For example, a first capacitance between the first pin 840 and the third pin 844 is equal to a second capacitance between the second pin 842 and the fourth pin 846. Herein, geometric or electrical characteristics of components (e.g., lengths of conductive leads or open circuit impedances of conductive coils) are the considered "equal" if the difference between their respective values is less than a tolerance (e.g., less than 0.1% difference or less than 0.5% difference).

The device 800 includes an electronic component body 850 made of an insulator that fastens the magnetic core 810, the first pin 840, the second pin 842, the third pin 844, and the fourth pin 846. For example, the electronic component body 850 may be composed of an insulator such as ceramic or plastic (e.g., thermoset or thermoplastic). In this example, the first pin 840 is exposed on a first bottom corner of the electronic component body 850 and extends up a side of the electronic component body 850. The second pin 842 is exposed on a second bottom corner of the electronic component body 850 and extends up a side of the electronic component body 850. The third pin 844 is exposed on a third bottom corner of the electronic component body 850 and extends up a side of the electronic component body 850. The fourth pin 846 is exposed on a fourth bottom corner of the electronic component body 850 and extends up a side of the electronic component body 850.

The device 800 includes a first slot 860 in a side of the electronic component body 850 through which the first conductive lead 830 is routed. The device 800 includes a second slot 862 in a side of the electronic component body 850 through which the second conductive lead 832 is routed. The device 800 includes a third slot 864 in a side of the electronic component body 850 through which the third conductive lead 834 is routed. The device 800 includes a fourth slot (866—not shown in FIG. 8) in a side of the electronic component body 850 through which the fourth conductive lead (836—not shown in FIG. 8) is routed. For example, the slots (860-866) may be open groves in the sides of the electronic component body 850 as depicted in FIG. 8. In some implementations (not shown in FIG. 8), the slots (860-866) may be closed passages or enclosures (e.g., tubes) in the sides of the electronic component body 850. The slots (860-866) may facilitate having conductive leads (830-836)

that have equal lengths and a compact and symmetric design for the device 800 that results in low mode conversion for magnetically coupled inductor applications such as those depicted in FIG. 2 and FIG. 3.

For example, the device 800 may be used in power over data line applications (e.g., applications described in relation to FIGS. 1-7). The device 800 may be included in a larger apparatus or system that includes a first data-line conductor (e.g., the first data-line conductor 106, the first data-line conductor 206, or the first data-line conductor 306), a second data-line conductor (e.g., the second data-line conductor 108, the second data-line conductor 208, or the second data-line conductor 308), and a common ground return path (e.g., the external return path 170, the external return path 270, or the chassis return path 370). The first data-line conductor may be connected to the first conductive coil 820. The first conductive coil 820 may couple electrical power over the first data-line conductor. The second data-line conductor may be connected to the second conductive coil 822. The second conductive coil 822 may couple electrical power over the first data-line conductor. The common ground return path may be configured to carry return current corresponding to the electrical power coupled over the first data-line conductor and to electrical power coupled over the second data-line conductor. The first data-line conductor and the second data-line conductor may also be configured to carry a differential data signal for a data interface (e.g., the data interface 104, the data interface 204, or the data interface 304). In some implementations, the common ground return path includes a vehicle chassis. The device 800 may be connected to the rest of a power over data line system in manner such that the first conductive coil 820 and the second conductive coil 822 are magnetically coupled such that a first magnetic flux produced by a first current through the first conductive coil generated by a direct current power source (e.g., the DC voltage source 110, the DC voltage source 210, or the DC voltage source 310) opposes a second magnetic flux produced by a second current through the second conductive coil generated by the direct current power source. Such a configuration may efficiently pass direct current power through the first conductive coil 820 and the second conductive coil 822 and reject high-frequency differential data signals, while causing low mode conversion on the data-line conductors.

For example, the device 800 may be connected to an apparatus including a first data-line conductor (e.g., the first data-line conductor 106, the first data-line conductor 206, or the first data-line conductor 306) and a second data-line conductor (e.g., the second data-line conductor 108, the second data-line conductor 208, or the second data-line conductor 308) that are configured to couple differential data signals. The apparatus may include a direct current power source (e.g., the DC voltage source 110, the DC voltage source 210, or the DC voltage source 310) having a first terminal and a second terminal, where the first terminal may be connected through the first conductive coil 820 to the first data-line conductor and the first terminal may be connected through the second conductive coil 822 to the second data-line conductor. The apparatus may include a conductive support structure (e.g., the external return path 170, the external return path 270, or the chassis return path 370) that is connected to the second terminal. In some implementations, the conductive support structure is a vehicle chassis.

For example, the device 800 may be connected to an apparatus including a first data-line conductor (e.g., the first data-line conductor 106, the first data-line conductor 206, or the first data-line conductor 306) and a second data-line conductor (e.g., the second data-line conductor 108, the second data-line conductor 208, or the second data-line conductor 308) that are configured to couple differential data signals. The apparatus may include an electrical load (e.g., the electrical load 120, the electrical load 220, or the electrical load 320) having a first terminal and a second terminal, where the first terminal may be connected through the first conductive coil 820 to the first data-line conductor and the first terminal may be connected through the second conductive coil 822 to the second data-line conductor. The apparatus may include a conductive support structure (e.g., the external return path 170, the external return path 270, or the chassis return path 370) that is connected to the second terminal. In some implementations, the conductive support structure is a vehicle chassis.

Figure 9:
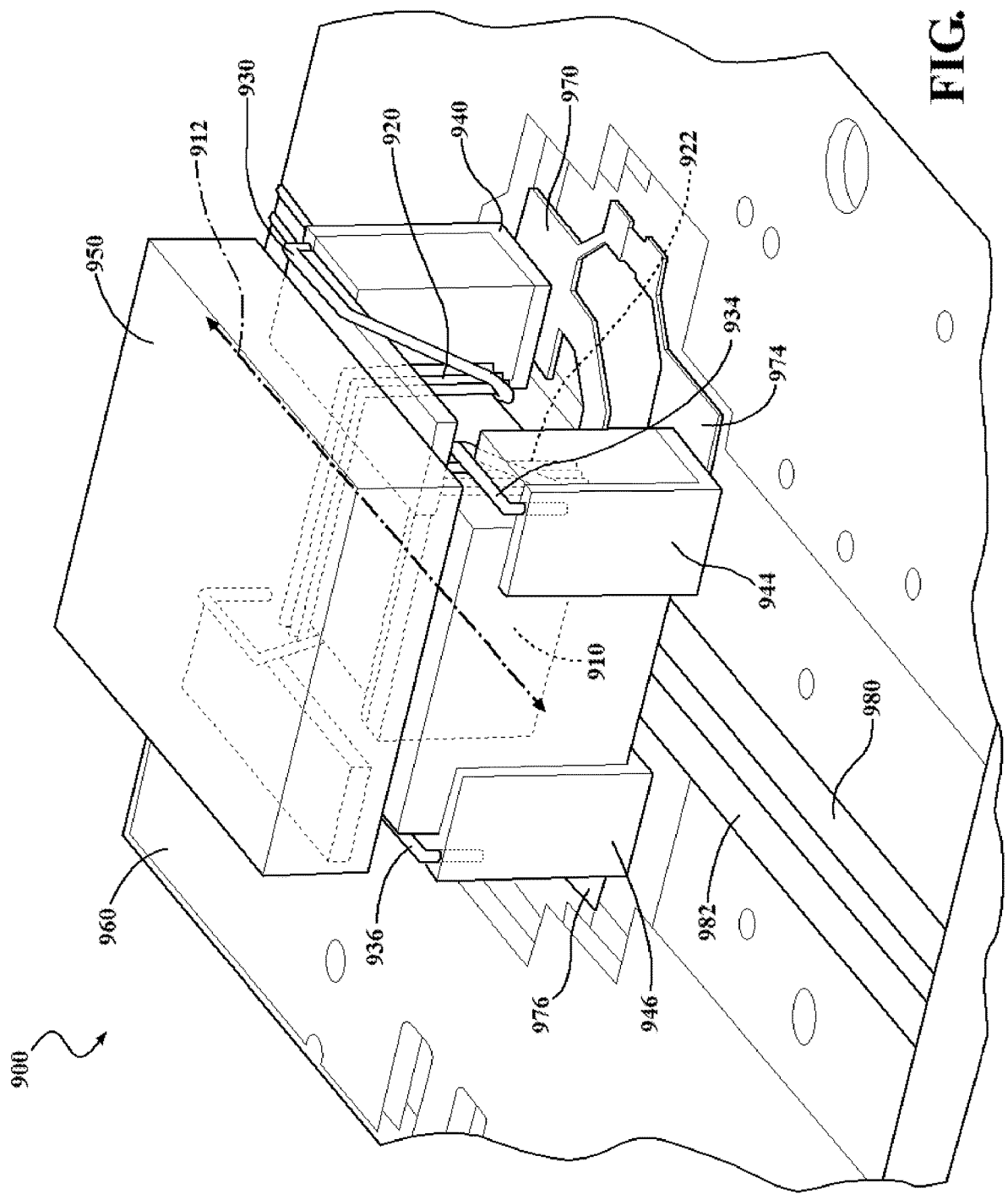
FIG. 9 is a drawing of an example of an apparatus including a pair of inductors wound around a common magnetic core that are mounted on circuit board including data-line traces.

FIG. 9 is a drawing of an example of an apparatus 900 including a pair of inductors wound around a common magnetic core that are mounted on circuit board including data-line traces. The apparatus 900 includes a magnetic core 910; a first conductive coil 920 wound around the magnetic core 910; a second conductive coil 922 wound around the magnetic core; four conductive leads (e.g., 930-936) that connect ends of the conductive coils (920 and 922) to four respective pins (940-946); an electronic component body 950; and a circuit board 960 including four pads (970-974) respectively connected to the pins (940-946), and a first data-line trace 980 and a second data-line trace 982 that are oriented parallel to a length of the magnetic core 910 around which the first conductive coil 920 and the second conductive coil 922 are wound. For example, the apparatus 900 may be used to implement the magnetically coupled inductors L1 and L2 of FIG. 2. For example, the apparatus 900 may be used to implement the magnetically coupled inductors L3 and L4 of FIG. 2. For example, the apparatus 900 may be used to implement the magnetically coupled inductors L1 and L2 of FIG. 3. For example, the apparatus 900 may be used to implement the magnetically coupled inductors L3 and L4 of FIG. 3.

The apparatus 900 includes a magnetic core 910. For example, the magnetic core 910 may be made of a material with high magnetic permeability. For example, the magnetic core 910 may be composed of a ferromagnetic metal (e.g., iron) or a ferrimagnetic compound (e.g., a ferrite). For example, the magnetic core 910 may be made of silicon steel or carbonyl iron. For example, the magnetic core 910 may include a rod shaped portion (e.g., a cylindrical or bar shaped rod) around which conductive coils may be wound. For illustration purposes, an axis 912 parallel to length of the rod shaped portion of the magnetic core 910 is shown in FIG. 9.

The apparatus 900 includes a first conductive coil 920 wound around the magnetic core 910. The apparatus 900 includes a second conductive coil 922 wound around the magnetic core 910. For example, the first conductive coil 920 and the second conductive coil 922 may be composed of a conductor such as copper. In some implementations, the first conductive coil 920 and the second conductive coil 922 are wound in opposite directions around the magnetic core 910.

The apparatus 900 includes a first conductive lead 930 connecting a first end of the first conductive coil 920 to a first pin 940. The apparatus 900 includes a second conductive lead (932—not shown in FIG. 9) connecting a second end of the first conductive coil 920 to a second pin (942—not shown in FIG. 9). The apparatus 900 includes a third conductive lead 934 connecting a first end of the second conductive coil 922 to a third pin 944. The apparatus 900 includes a fourth conductive lead 936 connecting a second end of the second conductive coil 922 to a fourth pin 946.

The apparatus 900 includes an electronic component body 950 made of an insulator that fastens the magnetic core 910, the first pin 940, the second pin (942—not shown), the third pin 944, and the fourth pin 946. For example, the electronic component body 950 may be composed of an insulator such as ceramic or plastic (e.g., thermoset or thermoplastic).

For example, the magnetic core 910, the conductive coils (920 and 922), the conductive leads (930-936), the pins (940-946), and the electronic component body 950 of the apparatus 900 may be implemented using the device 800 of FIG. 8.

The apparatus 900 includes a circuit board 960. For example, the circuit board 960 may be a printed circuit board (PCB). For example, the circuit board 960 may include one or more layers of copper etched to form features including traces and pads for connecting with electronic components. The one or more layers of copper may be separated by non-conductive layers (e.g., made of FR-4 glass epoxy) of the circuit board 960.

The circuit board 960 includes four pads (970, 972—not shown, 974, and 976) respectively connected to the first pin 940, the second pin (942—not shown), the third pin 944, and the fourth pin 946. For example the pins (940-946) may be soldered to the respective pads (970-976).

The circuit board 960 includes a first data-line trace 980 and a second data-line trace 982 that are oriented parallel to a length of the magnetic core 910 around which the first conductive coil 920 and the second conductive coil 922 are wound. For example, an axis 912 along the length of a rod portion of the magnetic core 910 around which the first conductive coil 920 and the second conductive coil 922 are wound may be parallel to the first data-line trace 980 and the second data-line trace 982. Having the length of the wrapped portion of the magnetic core 910 parallel to the data-line traces (980 and 982), which are near the conductive coils (920 and 922), may provide advantages including low mode conversion in power over data line applications (e.g., applications described in FIGS. 1-7). For example, this relative orientation may provide symmetry across a plane separating the first data-line trace 980 and the second data-line trace 982. For example, this relative orientation may mitigate magnetic coupling between the conductive coils (920 and 922) and the data-line traces (980 and 982). In some implementations, the first data-line trace 980 is electrically connected to the first pad 970 and the second data-line trace 982 is electrically connected to the fourth pad 976.

For example, the apparatus 900 may be used in power over data line applications (e.g., applications described in relation to FIGS. 1-7). The apparatus 900 may be included in a larger apparatus or system that includes a first data-line conductor (e.g., the first data-line conductor 106, the first data-line conductor 206, or the first data-line conductor 306) including the first data-line trace 980, a second data-line conductor (e.g., the second data-line conductor 108, the second data-line conductor 208, or the second data-line conductor 308) including the second data-line trace 982, and a common ground return path (e.g., the external return path 170, the external return path 270, or the chassis return path 370). The first data-line conductor may be connected to the first conductive coil 920 via the first data-line trace 980. The first conductive coil 920 may couple electrical power over the first data-line conductor via the first data-line trace 980. The second data-line conductor may be connected to the second conductive coil 922 via the second data-line trace 982. The second conductive coil 922 may couple electrical power over the first data-line conductor via the second data-line trace 982. The common ground return path may be configured to carry return current corresponding to the electrical power coupled over the first data-line conductor and to electrical power coupled over the second data-line conductor. The first data-line conductor and the second data-line conductor may also be configured to carry a differential data signal for a data interface (e.g., the data interface 104, the data interface 204, or the data interface 304). In some implementations, the common ground return path includes a vehicle chassis. The apparatus 900 may be connected to the rest of a power over data line system in manner such that the first conductive coil 920 and the second conductive coil 922 are magnetically coupled such that a first magnetic flux produced by a first current through the first conductive coil 920 generated by a direct current power source (e.g., the DC voltage source 110, the DC voltage source 210, or the DC voltage source 310) opposes a second magnetic flux produced by a second current through the second conductive coil 922 generated by the direct current power source. Such a configuration may efficiently pass direct current power through the first conductive coil 920 and the second conductive coil 922 and reject high-frequency differential data signals, while causing low mode conversion on the data-line conductors.

For example, the apparatus 900 may be connected to an apparatus including a first data-line conductor (e.g., the first data-line conductor 106, the first data-line conductor 206, or the first data-line conductor 306) and a second data-line conductor (e.g., the second data-line conductor 108, the second data-line conductor 208, or the second data-line conductor 308) that are configured to couple differential data signals. The apparatus may include a direct current power source (e.g., the DC voltage source 110, the DC voltage source 210, or the DC voltage source 310) having a first terminal and a second terminal, where the first terminal may be connected through the first conductive coil 920 to the first data-line conductor and the first terminal may be connected through the second conductive coil 922 to the second data-line conductor. The apparatus may include a conductive support structure (e.g., the external return path 170, the external return path 270, or the chassis return path 370) that is connected to the second terminal. In some implementations, the conductive support structure is a vehicle chassis.

For example, the apparatus 900 may be connected to an apparatus including a first data-line conductor (e.g., the first data-line conductor 106, the first data-line conductor 206, or the first data-line conductor 306) and a second data-line conductor (e.g., the second data-line conductor 108, the second data-line conductor 208, or the second data-line conductor 308) that are configured to couple differential data signals. The apparatus may include an electrical load (e.g., the electrical load 120, the electrical load 220, or the electrical load 320) having a first terminal and a second terminal, where the first terminal may be connected through the first conductive coil 920 to the first data-line conductor and the first terminal may be connected through the second conductive coil 922 to the second data-line conductor. The apparatus may include a conductive support structure (e.g., the external return path 170, the external return path 270, or the chassis return path 370) that is connected to the second terminal. In some implementations, the conductive support structure is a vehicle chassis.

In some implementations (not shown in the figures), the device 800 may be mounted on an opposite side of a circuit board from the data-line traces (e.g., the first data-line trace 980 and the second data-line trace 982) that bear the differential data signals near the inductors of the device 800. A ground plane on an inner layer of the circuit board may be interposed between the device 800 and the data-line traces to further mitigate magnetic coupling between the inductors and data-line traces that otherwise could be a source of mode conversion. For example, an apparatus including the device 800 may also include a circuit board that includes four pads respectively connected to the first pin 840, the second pin 842, the third pin 844, and the fourth pin 846, where the four pads are on a first side of the circuit board. The circuit board may also include a ground plane on an inner layer of the circuit board. The circuit board may also include a first data-line trace and a second data-line trace that are routed on a second side of the circuit board. In some implementations, the first data-line trace and the second data-line trace on the second side of the circuit board may be oriented parallel to a length of the magnetic core 810 around which the first conductive coil 820 and the second conductive coil 822 are wound.

Figure 10A:
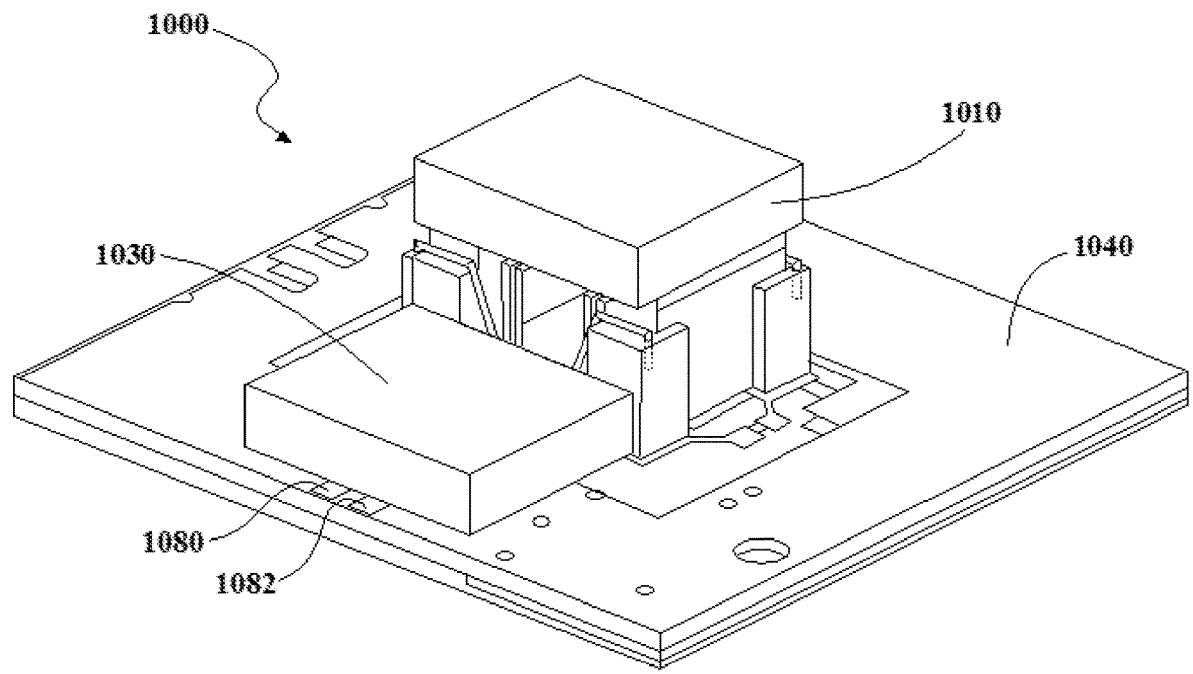
FIGS. 10A and 10B are drawings of two views of an example of an apparatus including a pair of inductors wound around a common magnetic core and a ferrite plate that are mounted on circuit board including data-line traces.
Figure 10B:
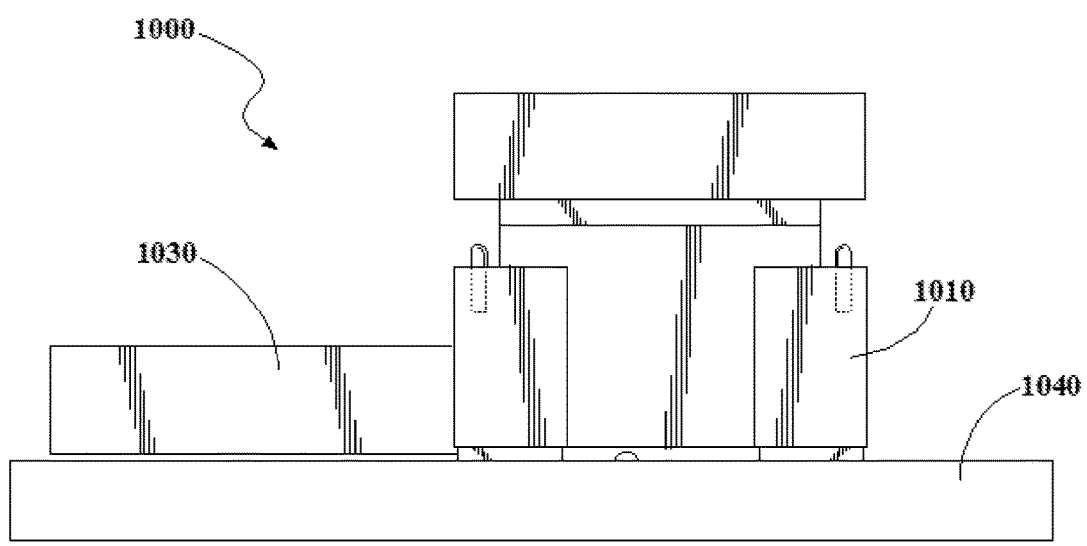

FIGS. 10A and 10B are drawings of two views of an example of an apparatus 1000 including a pair of inductors 1010 wound around a common magnetic core and a ferrite plate 1030 that are mounted on circuit board 1040 including data-line traces (1080 and 1082). FIG. 10A is view with perspective of the apparatus 1000. FIG. 10B is a side view of the apparatus 1000.

The apparatus 1000 includes a pair of inductors 1010. The pair of inductors 1010 may be magnetically coupled together. The pair of inductors 1010 may include an electronic component body made of an insulator that fastens a magnetic core (e.g., a magnetic core around which coils of the two inductors are wound), the first pin, the second pin, the third pin, and the fourth pin (e.g., where the pins are terminals of the two inductors). For example, the pair of inductors 1010 may be implemented with the device 800 of FIG. 8.

The apparatus 1000 includes the circuit board 1040. For example, the circuit board 1040 may be a printed circuit board (PCB). For example, the circuit board 1040 may include one or more layers of copper etched to form features including traces and pads for connecting with electronic components. The one or more layers of copper may be separated by non-conductive layers (e.g., made of FR-4 glass epoxy) of the circuit board 1040.

The circuit board 1040 includes four pads respectively connected to (e.g., soldered to) a first pin, a second pin, a third pin, and a fourth pin of the pair of inductors 1010. The circuit board 1040 includes a first data-line trace 1080 and a second data-line trace 1082 that are routed between the four pads. For example, the first data-line trace 1080 may be connected, via one of the pads and its respective pin, to a terminal of one of the pair of inductors 1010. For example, the second data-line trace 1082 may be connected, via another one of the pads and its respective pin, to a terminal of another one of the pair of inductors 1010.

The apparatus 1000 includes a ferrite plate 1030 fastened over the first data-line trace 1080 and the second data-line trace 1082 and adjacent to the electronic component body of the pair of inductors 1010. For example, the ferrite plate 1030 may be composed of manganese-zinc ferrite or nickel-zinc ferrite. For example, copper tape may be placed between the ferrite plate 1030 and solder mask over the first data-line trace 1080 and the second data-line trace 1082 to fasten the ferrite plate 1030 in position. For example, the ferrite plate 1030 may have dimensions of approximately 6 mm×6 mm×2 mm. The ferrite plate 1030 may be positioned horizontally over the first data-line trace 1080 and the second data-line trace 1082, as shown in FIGS. 10A and 10B. In some implementations (not shown), the ferrite plate 1030 may be positioned vertically against the side of the electronic component body of the pair of inductors 1010 from which the data-line traces (1080 and 1082) extend.

In some implementations (not shown), a ferrite plate (e.g., the ferrite plate 1030) may be fastened (e.g., using copper tape) over the first data-line trace 980 and the second data-line trace 982 and adjacent to the electronic component body 950 of the apparatus 900 of FIG. 9.

A first implementation is an apparatus that includes: a magnetic core; a first conductive coil wound in a first winding direction around the magnetic core; a second conductive coil wound in a second winding direction around the magnetic core; a first conductive lead connecting a first end of the first conductive coil to a first pin; a second conductive lead connecting a second end of the first conductive coil to a second pin; a third conductive lead connecting a first end of the second conductive coil to a third pin; and a fourth conductive lead connecting a second end of the second conductive coil to a fourth pin. In the first implementation: the first conductive lead, the second conductive lead, the third conductive lead, and the fourth conductive lead are a same length.

The apparatus of the first implementation may include: an electronic component body made of an insulator that fastens the magnetic core, the first pin, the second pin, the third pin, and the fourth pin; a first slot in a side of the electronic component body through which the first conductive lead is routed; a second slot in a side of the electronic component body through which the second conductive lead is routed; a third slot in a side of the electronic component body through which the third conductive lead is routed; and a fourth slot in a side of the electronic component body through which the fourth conductive lead is routed. The first implementation may be configured such that: the first pin is exposed on a first bottom corner of the electronic component body and extends up a side of the electronic component body; the second pin is exposed on a second bottom corner of the electronic component body and extends up a side of the electronic component body; the third pin is exposed on a third bottom corner of the electronic component body and extends up a side of the electronic component body; and the fourth pin is exposed on a fourth bottom corner of the electronic component body and extends up a side of the electronic component body.

The apparatus of the first implementation may include a circuit board that includes: four pads respectively connected to the first pin, the second pin, the third pin, and the fourth pin; and a first data-line trace and a second data-line trace that are oriented parallel to a length of the magnetic core around which the first conductive coil and the second conductive coil are wound.

The apparatus of the first implementation may include: a first data-line conductor and a second data-line conductor that are configured to couple differential data signals; a direct current power source having a first terminal and a second terminal, wherein the first terminal is connected through the first conductive coil to the first data-line conductor and the first terminal is connected through the second conductive coil to the second data-line conductor; and a conductive support structure that is connected to the second terminal. The first implementation may be configured such that the conductive support structure is a vehicle chassis.

The apparatus of the first implementation may include: a first data-line conductor and a second data-line conductor that are configured to couple differential data signals; an electrical load having a first terminal and a second terminal, wherein the first terminal is connected through the first conductive coil to the first data-line conductor and the first terminal is connected through the second conductive coil to the second data-line conductor; and a conductive support structure that is connected to the second terminal.

The apparatus of the first implementation may include a circuit board that includes: four pads respectively connected to the first pin, the second pin, the third pin, and the fourth pin; a first data-line trace and a second data-line trace that are routed between the four pads; an electronic component body made of an insulator that fastens the magnetic core, the first pin, the second pin, the third pin, and the fourth pin; and a ferrite plate fastened over the first data-line trace and the second data-line trace and adjacent to the electronic component body.

The apparatus of the first implementation may include a circuit board that includes: four pads respectively connected to the first pin, the second pin, the third pin, and the fourth pin, wherein the four pads are on a first side of the circuit board; a ground plane on an inner layer of the circuit board; and a first data-line trace and a second data-line trace that are routed on a second side of the circuit board.

The first implementation may be configured such that the first winding direction is opposite of the second winding direction.

A second implementation is an apparatus for coupling power over data-line conductors that includes: a magnetic core; a first conductive coil wound around the magnetic core; a second conductive coil wound around the magnetic core; a first conductive lead connecting a first end of the first conductive coil to a first pin; a second conductive lead connecting a second end of the first conductive coil to a second pin; a third conductive lead connecting a first end of the second conductive coil to a third pin; and a fourth conductive lead connecting a second end of the second conductive coil to a fourth pin; an electronic component body made of an insulator that fastens the magnetic core, the first pin, the second pin, the third pin, and the fourth pin; and a circuit board including: four pads respectively connected to the first pin, the second pin, the third pin, and the fourth pin; and a first data-line trace and a second data-line trace that are oriented parallel to a length of the magnetic core around which the first conductive coil and the second conductive coil are wound.

The apparatus of the second implementation may include: a first data-line conductor and a second data-line conductor that are configured to couple differential data signals; a direct current power source having a first terminal and a second terminal, wherein the first terminal is connected through the first conductive coil to the first data-line conductor and the first terminal is connected through the second conductive coil to the second data-line conductor; and a conductive support structure that is connected to the second terminal. The second implementation may be configured such that the conductive support structure is a vehicle chassis.

The apparatus of the second implementation may include: a first data-line conductor and a second data-line conductor that are configured to couple differential data signals; an electrical load having a first terminal and a second terminal, wherein the first terminal is connected through the first conductive coil to the first data-line conductor and the first terminal is connected through the second conductive coil to the second data-line conductor; and a conductive support structure that is connected to the second terminal.

The apparatus of the second implementation may include: a ferrite plate fastened over the first data-line trace and the second data-line trace and adjacent to the electronic component body.

The second implementation may be configured such that the first conductive coil and the second conductive coil are magnetically coupled such that a first magnetic flux produced by a first current through the first conductive coil generated by a direct current power source opposes a second magnetic flux produced by a second current through the second conductive coil generated by the direct current power source.

A third implementation is an apparatus for coupling electrical power over data-line conductors that includes: a magnetic core; a first conductive coil wound in a first winding direction around the magnetic core; a second conductive coil wound in a second winding direction around the magnetic core, wherein the first winding direction is opposite of the second winding direction; a first data-line conductor that is connected to the first conductive coil, wherein the first conductive coil couples electrical power over the first data-line conductor; a second data-line conductor that is connected to the second conductive coil, wherein the second conductive coil couples electrical power over the first data-line conductor; and a common ground return path configured to carry return current corresponding to the electrical power coupled over the first data-line conductor and to electrical power coupled over the second data-line conductor, wherein the first data-line conductor and the second data-line conductor are also configured to carry a differential data signal for a data interface.

The third implementation may be configured such that a spacing between the first conductive coil and the second conductive coil along a length of the magnetic core is greater than two millimeters.

The third implementation may be configured such that the common ground return path includes a vehicle chassis.

The third implementation may be configured such that the first conductive coil and the second conductive coil are magnetically coupled such that a first magnetic flux produced by a first current through the first conductive coil generated by a direct current power source opposes a second magnetic flux produced by a second current through the second conductive coil generated by the direct current power source.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
 a magnetic core;
 a first conductive coil wound in a first winding direction around the magnetic core;
 a second conductive coil wound in a second winding direction around the magnetic core;
 a first conductive lead connecting a first end of the first conductive coil to a first pin;
 a second conductive lead connecting a second end of the first conductive coil to a second pin;

a third conductive lead connecting a first end of the second conductive coil to a third pin, wherein a length of the first conductive lead is equal to a length of the third conductive lead; and a fourth conductive lead connecting a second end of the second conductive coil to a fourth pin, wherein a length of the second conductive lead is equal to a length of the fourth conductive lead.

2. The apparatus of claim 1, wherein a first open circuit impedance of the first conductive coil is equal to a second open circuit impedance of the second conductive coil.

3. The apparatus of claim 1, wherein the apparatus is symmetric about a plane bisecting the apparatus between the first pin and the third pin and between the second pin and the fourth pin.

4. The apparatus of claim 1, wherein a first approach angle between the first conductive lead and the magnetic core is equal to a second approach angle between the third conductive lead and the magnetic core, and a third approach angle between the second conductive lead and the magnetic core is equal to a fourth approach angle between the fourth conductive lead and the magnetic core.

5. The apparatus of claim 1, wherein the length of the first conductive lead is equal to the length of the fourth conductive lead.

6. The apparatus of claim 1, wherein a first capacitance between the first pin and the third pin is equal to a second capacitance between the second pin and the fourth pin.

7. The apparatus of claim 1, comprising:
an electronic component body made of an insulator that fastens the magnetic core, the first pin, the second pin, the third pin, and the fourth pin;
a first slot in a side of the electronic component body through which the first conductive lead is routed;
a second slot in a side of the electronic component body through which the second conductive lead is routed;
a third slot in a side of the electronic component body through which the third conductive lead is routed; and
a fourth slot in a side of the electronic component body through which the fourth conductive lead is routed.

8. The apparatus of claim 7, wherein:
the first pin is exposed on a first bottom corner of the electronic component body and extends up a side of the electronic component body;
the second pin is exposed on a second bottom corner of the electronic component body and extends up a side of the electronic component body;
the third pin is exposed on a third bottom corner of the electronic component body and extends up a side of the electronic component body; and
the fourth pin is exposed on a fourth bottom corner of the electronic component body and extends up a side of the electronic component body.

9. The apparatus of claim 1, comprising a circuit board that includes:
four pads respectively connected to the first pin, the second pin, the third pin, and the fourth pin; and
a first data-line trace and a second data-line trace that are oriented parallel to a length of the magnetic core around which the first conductive coil and the second conductive coil are wound.

10. The apparatus of claim 1, comprising:
a first data-line conductor and a second data-line conductor that are configured to couple differential data signals;
a direct current power source having a first terminal and a second terminal, wherein the first terminal is connected through the first conductive coil to the first data-line conductor and the first terminal is connected through the second conductive coil to the second data-line conductor; and
a conductive support structure that is connected to the second terminal.

11. The apparatus of claim 10, wherein the conductive support structure is a vehicle chassis.

12. The apparatus of claim 1, comprising:
a first data-line conductor and a second data-line conductor that are configured to couple differential data signals;
an electrical load having a first terminal and a second terminal, wherein the first terminal is connected through the first conductive coil to the first data-line conductor and the first terminal is connected through the second conductive coil to the second data-line conductor; and
a conductive support structure that is connected to the second terminal.

13. The apparatus of claim 1, comprising a circuit board that includes:
four pads respectively connected to the first pin, the second pin, the third pin, and the fourth pin;
a first data-line trace and a second data-line trace that are routed between the four pads;
an electronic component body made of an insulator that fastens the magnetic core, the first pin, the second pin, the third pin, and the fourth pin; and
a ferrite plate fastened over the first data-line trace and the second data-line trace and adjacent to the electronic component body.

14. The apparatus of claim 1, comprising a circuit board that includes:
four pads respectively connected to the first pin, the second pin, the third pin, and the fourth pin, wherein the four pads are on a first side of the circuit board;
a ground plane on an inner layer of the circuit board; and
a first data-line trace and a second data-line trace that are routed on a second side of the circuit board.

15. An apparatus for coupling power over data-line conductors comprising:
a magnetic core;
a first conductive coil wound around the magnetic core;
a second conductive coil wound around the magnetic core;
a first conductive lead connecting a first end of the first conductive coil to a first pin;
a second conductive lead connecting a second end of the first conductive coil to a second pin;
a third conductive lead connecting a first end of the second conductive coil to a third pin; and
a fourth conductive lead connecting a second end of the second conductive coil to a fourth pin;
an electronic component body made of an insulator that fastens the magnetic core, the first pin, the second pin, the third pin, and the fourth pin; and
a circuit board including:
four pads respectively connected to the first pin, the second pin, the third pin, and the fourth pin; and
a first data-line trace and a second data-line trace that are oriented parallel to a length of the magnetic core around which the first conductive coil and the second conductive coil are wound.

16. The apparatus of claim 15, comprising:
a first data-line conductor and a second data-line conductor that are configured to couple differential data signals;
a direct current power source having a first terminal and a second terminal, wherein the first terminal is connected through the first conductive coil to the first data-line conductor and the first terminal is connected through the second conductive coil to the second data-line conductor; and
a conductive support structure that is connected to the second terminal.

17. The apparatus of claim 16, wherein the conductive support structure is a vehicle chassis.

18. The apparatus of claim 15, comprising:
a first data-line conductor and a second data-line conductor that are configured to couple differential data signals;
an electrical load having a first terminal and a second terminal, wherein the first terminal is connected through the first conductive coil to the first data-line conductor and the first terminal is connected through the second conductive coil to the second data-line conductor; and
a conductive support structure that is connected to the second terminal.

19. The apparatus of claim 15, comprising:
a ferrite plate fastened over the first data-line trace and the second data-line trace and adjacent to the electronic component body.

20. The apparatus of claim 15, wherein the first conductive coil and the second conductive coil are magnetically coupled such that a first magnetic flux produced by a first current through the first conductive coil generated by a direct current power source opposes a second magnetic flux produced by a second current through the second conductive coil generated by the direct current power source.

* * * * *